United States Patent [19]
Johannsen

[11] 3,843,246

[45] Oct. 22, 1974

[54] STORAGE MAGAZINE FOR DIAPOSITIVE SLIDES

[75] Inventor: Hans Werner Johannsen, Braunsfeld, Germany

[73] Assignee: Braun Aktiengesellschaft, Frankfurt/Main, Germany

[22] Filed: Feb. 20, 1973

[21] Appl. No.: 333,713

[30] Foreign Application Priority Data
Feb. 22, 1972 Germany............................ 2208127

[52] U.S. Cl.................... 353/117, 206/72, 353/120
[51] Int. Cl. ........................................... G03b 23/06
[58] Field of Search ....... 353/117, 120, 107; 206/72

[56] References Cited
UNITED STATES PATENTS

| | | | |
|---|---|---|---|
| 3,606,545 | 9/1971 | Heinzmann ....................... | 353/117 |
| 3,644,031 | 2/1972 | Bennett.............................. | 353/117 |
| 3,718,392 | 2/1973 | Harvey............................... | 353/120 |

*Primary Examiner*—Louis R. Prince
*Assistant Examiner*—A. J. Mirabito
*Attorney, Agent, or Firm*—Ernest F. Marmorek

[57] ABSTRACT

A slide storage magazine for use with a slide projector in which a removable insert is provided to subdivide the original storage slots to enable the alternate storing of thicker or narrower slides using the same basic unit.

7 Claims, 4 Drawing Figures

PATENTED OCT 22 1974  3,843,246

STORAGE MAGAZINE FOR DIAPOSITIVE SLIDES

CROSS-REFERENCE TO RELATED APPLICATION

Reference is had to my co-pending application, Ser. No. 328,340 filed Jan. 31, 1973.

FIELD OF THE INVENTION

The present invention relates to a storage magazine for diapositives slides which is rotatable about its longitudinal axis and, which can be used to cooperate with the automatic advancing means of slide projectors.

BACKGROUND OF THE INVENTION

In this type of storage magazine usually there are provided storage slots which have a certain width in order to accommodate slides which may have the largest thickness, such as glass covered slides. Since some time, however, there are slides in use which are provided with different frames, such as, a thick paper or carton-type frame, instead of the old glass cover. As a result, the total thickness of a framed slide may have various dimensions, depending on the type of the frame used on it.

The requirement that the width of the storage slots should fit the total thickness of the slides which are framed, is a basic requirement for a smooth functioning of the advancing or changing process within the slide projector. In the event, slides having a narrower thickness are used, such as the paper framed slides, then they would have a large play within the storage slots of the conventional types built to accommodate the glass cover slides and, this would lead to considerable difficulties during the slide advancing or changing process of the projector. It has been already proposed to use fillers in order to reduce the original storage width of a slot.

Such complicated and, under certain circumstances unuseable, impractical fillers will lead to the disadvantage that when thinner slides are used, then a great deal of storage space is left in each storage slot, or when thicker slides are used, then a different type of storage magazine should be used with the projector, which will considerably increase the costs of manufacturing and servicing of a slide projector.

SUMMARY OF THE INVENTION

It is, therefore, an object of the present invention to provide an improved storage magazine of the above-described type which eliminates the above-mentioned disadvantages of known storage magazines for slides.

It is a more specific object of the present invention to provide an improved slide storage magazine for automatic projectors in which the storing of slides having various thicknesses can be had by using the same magazine and, at the same time, the costs of manufacturing of such improved magazine is very low.

According to the present invention a removable means is provided to subdivide the existing slots of the storage magazine in their widths, along with means provided on the magazine which enables the advancing or further switching of the storage magazine within the projector in two different switching steps or at two different switching speeds, one step being associated with the original storage width, the other, with the subdivided storage width.

The invention provides that in a storage magazine which can be automatically advanced by the projection apparatus, when thinner slides are to be used, the storage slots are subdivided in such a manner that the original width of the storage slot is reduced and, thereby the storage capacity is doubled.

A further advantage of the present invention resides in that a single kind of storage magazine should be used for alternatively storing slides having various thickness, whereupon the manufacturing costs, especially the cost of the casting dies, are substantially reduced and, thereby the cost of the projector itself is substantially reduced, which fact enables a further spreading of its use by a wider layer of the population.

According to the present invention in a structurally simple and very advantageous embodiment thereof, the improvement resides in the provision of an insert means for the subdivision of the original storage slots of the storage magazine and which can be removably coupled with the basic storage magazine unit having the original storage slots therein and can be set thereupon by fitting a center hub portion of the insert means into a recess of the basic storage unit and, wherein the insert means is provided with a plurality of radially directed strips or webs having an equal spacing between each other and, the number of which corresponds to the number of the storage slots in the basic unit which are to be subdivided. The insert subdividing means includes also means to prevent its rotation after it has been set into the basic storage unit.

According to the present invention the insert means is provided with lug means or pin means and the basic storage unit is provided with cooperating recesses in order to securely insert it into the basic unit. The lug or pin means are fixedly secured on the insert means in the preferred embodiment.

According to the present invention the outer wall portion of the basic magazine unit which radially defines the storage slots therein is provided with recesses or grooves serving for the reception therein of the insert webs. The invention also provides that for each web of the insert means a corresponding groove is provided on the front side of the basic unit which is on the open side of the storage slots and, which cooperates with an appropriately recessed front surface of the insert means. As a result, a good guiding and fixing of the webs of the insert means and, thereby fixed location of the resulting storage slots becomes possible.

The invention also provides that the basic unit of the storage device is provided with two sets of means, such as, tooth formations, which are different in size and which serve for the engagement of the switching means performing the changing or advancing of the storage magazine and thereby of the slides in the projector.

According to the present invention the insert means and/or the basic storage unit can be provided separately with means serving for the advancing or switching of the storage slots in the projector.

The last-mentioned provision according to the present invention can be made in the form of a ring which is made in the form of a toothed or crown ring surrounding the webs of the insert means and coupling their radially outer end portions with each other and, which ring will serve for the advancing of the slide magazine.

According to the present invention the webs of the insert means themselves can be formed at their radially outer end portion as switching teeth projecting out of the circular wall of the magazine and which are then operable to perform to the switching of the magazine by cooperating with the switching element of the projector, such as with a switching ratchet and, pawl construction.

In the event the basic storage unit is set on a shaft which runs coaxially with the axle of the basic unit, which is connected therewith by means of a wedge coupling, then the advancing of the storage magazine can be performed by effecting the switching of the shaft selectively in various steps, so that each time a slide is advanced further.

BRIEF DESCRIPTION OF THE DRAWINGS

The invention will become more readily apparent from the following description of preferred embodiments thereof shown in the accompanying drawings, in which.

DESCRIPTION OF THE PREFERRED EMBODIMENTS

Figure 1:
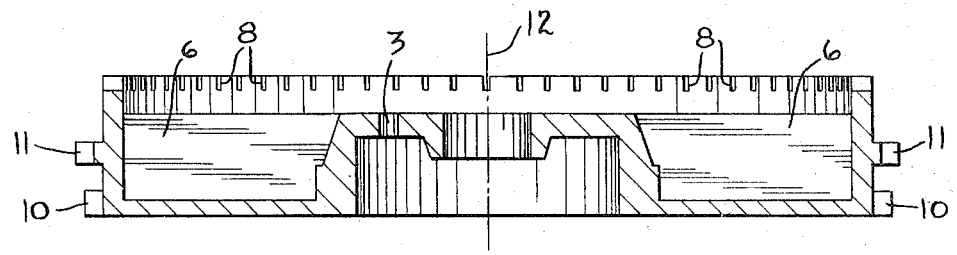
FIG. 1 is an illustration of a storage magazine having undivided storage slots therein, the section line being along A-B in FIG. 2.
Figure 2:
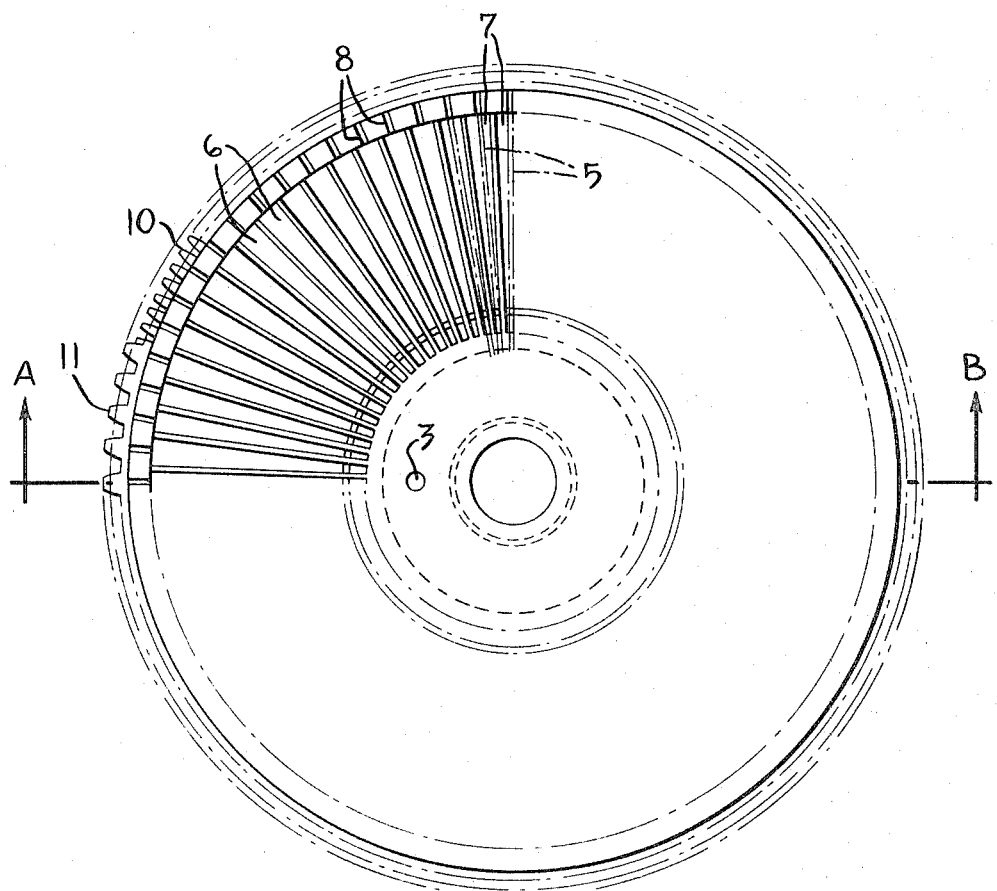
FIG. 2 is a plan view on the storage magazine of FIG. 1 with the provision of receiving an insert means thereon according to the present invention.
Figure 3:
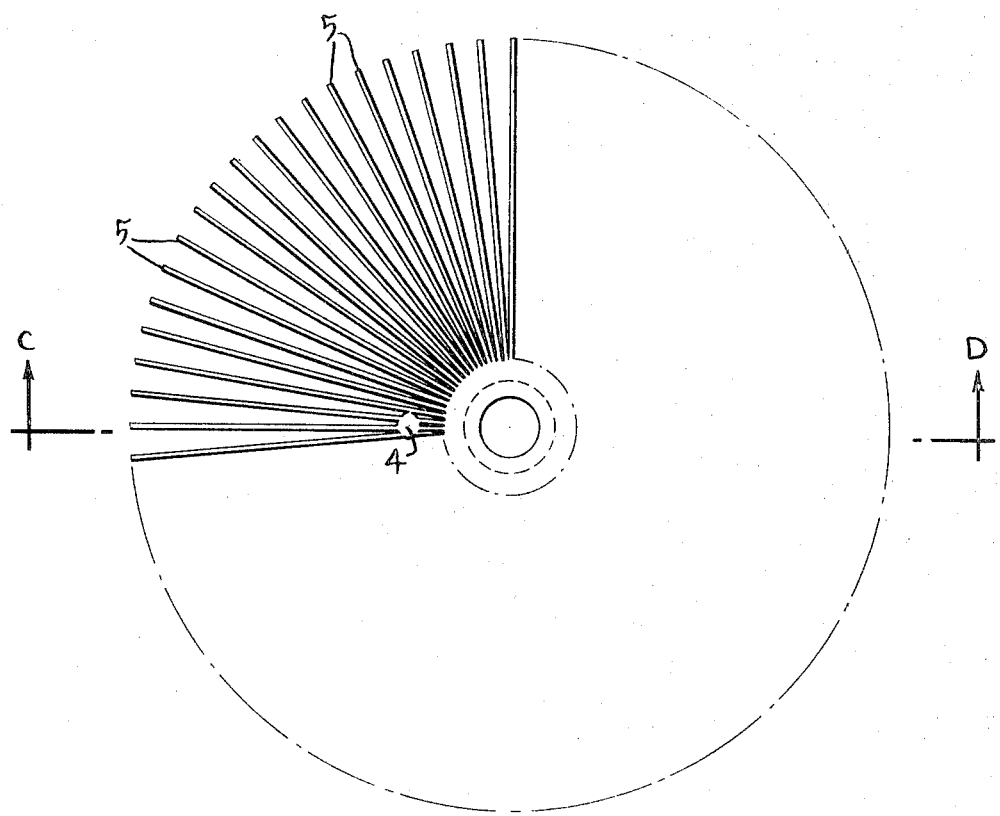
FIG. 3 is a partial plan view on the insert means according to the present invention, illustrating a major part of it only schematically for the sake of simplicity of illustration.
Figure 4:
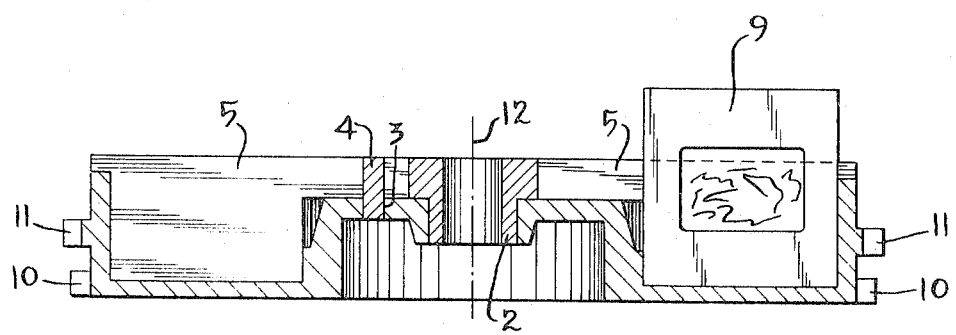
FIG. 4 is a similar illustration of the storage magazine as the illustration of FIG. 1 having the insert means mounted therein and having toothing on the basic unit of the storage device, the section being taken along line C-D of FIG. 3.

With reference to the figures, it is seen that the basic storage unit has a central hole or recess therein for receiving the hub 2 of the insert means when the insert means is mounted onto the basic unit. The insert means is removably mounted on the basic unit and it is provided with pin means 4 which cooperates with recess 3 formed in the basic unit in order to prevent a rotation of the insert means when mounted on the basic unit. The insert means is provided with a plurality of webs 5 which start from the hub 2 and which are radially directed away from the hub 2 and, after the insert means having been inserted onto its fixed position in the basic unit, then the webs 5 of the insert means subdivide the original storage slots 6 of the basic unit each into a pair of new storage slots 7 which have narrower width and which are to accommodate slides having narrower thickness. In FIG. 2 a few webs 5 of the insert means are illustrated with dashed line in the inserted position in order to provide an illustration how the original slots 6 thereof are subdivided by the webs 5 of the insert means. A slide is illustrated with reference numeral 9 in FIG. 4. In order to provide for a stable fixing of the slots 7 after the insert means is in its set position on the basic unit, grooves 8 are provided on the front surface of the outer wall portion of the basic unit intermediate of the original webs which define the wider slots therein.

In order that the entire storage magazine could be switched or advanced further within the slide projector, there are provided a pair of advancing means, for example, on the body of the basic unit in the form of a pair of toothed rings 10, 11 secured or formed on the basic unit as individual toothings and, which are brought into engagement with the selecting or advancing means of the projector, so that either one or the other can be selected for the advancing of the slides, depending on whether the slots 6 store slides of the heavier thickness or whether slides are stored in slots 7 which require a double toothing for advancing the storage unit in smaller steps. The basic unit is rotated on a shaft in a known manner, which shaft is not shown for the sake of avoiding crowding of the drawing and, it is mounted to rotate about its longitudinal axis 12 either in the upright or in the lying position. It is understood that the illustrated advancing means 10, 11 represent only an exemplary illustration of advancing means associated with the concept of subdivision of the original storage slots 6 according to the present invention, but other means can be provided which double the original advancing speed of the storage magazine. As mentioned above, the webs 5 of the insert means when set in fixing recesses 8 can be made longer to project beyond the front wall of the basic unit and serve as the set of teeth which engages the advancing means of the projector when the double steps are to be used with the subdivided slots 7. In this case the basic unit carries only a single crown to control the advancing speed for the original storage slots.

The advancing of the magazine can be had also with driving means affecting the rotation of shaft in steps without a crown on the basic unit.

For subdividing slots in a slide storage magazine by radially reducing the length of the original slots by an insert reference should be had to my copending application Ser. No. 328,340 filed on or about Jan. 31, 1973 under the title STORAGE MAGAZINE FOR DIAPOSITIVE SLIDES and which is assigned to the same assignee as the present application.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A circular storage magazine for storage of slides and for use with a slide projecting apparatus, comprising a base unit having a plurality of storage slots for storing slides having a predetermined thickness therein, insert means adapted to be inserted into said base unit of said storage magazine for subdividing said slots into a pair of slots for storing slides having a smaller thickness, said insert means for subdividing the storage slots being adapted for removable mounting on said base unit of said storage magazine, said base unit comprising a central recess, said insert means comprising a central hub means and a plurality of radially directed web means connected to said hub means, said hub means adapted to fit into said central recess of said base unit when inserted and, said web means subdividing said storage slots of said base unit into smaller slots, the number of said web means corresponding to the number of slots of said base unit, and securing means for securing said insert means against rotation when inserted into said base unit.

2. The storage magazine as claimed in claim 1, wherein said securing means comprises stud means on said insert means for cooperating with recess means formed in said base unit when said insert means is inserted into said storage magazine.

3. The storage magazine as claimed in claim 2, wherein said stud means is formed integrally with said insert means.

4. The storage magazine as claimed in claim 1, said storage magazine comprising a circular outer wall portion defining said storage slots therein in the radial direction, recess means provided in said wall portion for receiving said web means of said insert means therein when said insert means is inserted into said base unit.

5. The storage magazine as claimed in claim 4, wherein a plurality of said recesses is provided in said wall portion of said base storage unit on a side thereon facing the open side of said storage slots, each of said web means cooperating with a corresponding one of said recesses.

6. A circular storage magazine for storage of slides and for use with a slide projecting apparatus, comprising a base unit having a plurality of storage slots for storing slides having a predetermined thickness therein, and insert means adapted to be inserted into said base unit of said storage magazine for subdividing said slots into a pair of slots for storing slides having a smaller thickness, and comprising a central hub means, a plurality of radially directed web means connected to said hub means, said base storage unit provided with a pair of toothed means for the selective engagement by advancing means of the projector apparatus and thereby enabling the advancing of said storage magazine at two different steps, said web means are coupled together by means of a ring for forming with their radial end portions one of said toothed means serving for the advancing of the storage magazine by the advancing mechanism of the projector at a predetermined rate.

7. The storage magazine as claimed in claim 6, wherein said web means of said insert means at their radial end portions thereof are formed as switching teeth for enabling engagement with an advancing mechanism of the projection apparatus.

* * * * *